(No Model.) 2 Sheets—Sheet 1.
T. J. LINDSAY.
PLANTER.
No. 358,046. Patented Feb. 22, 1887.
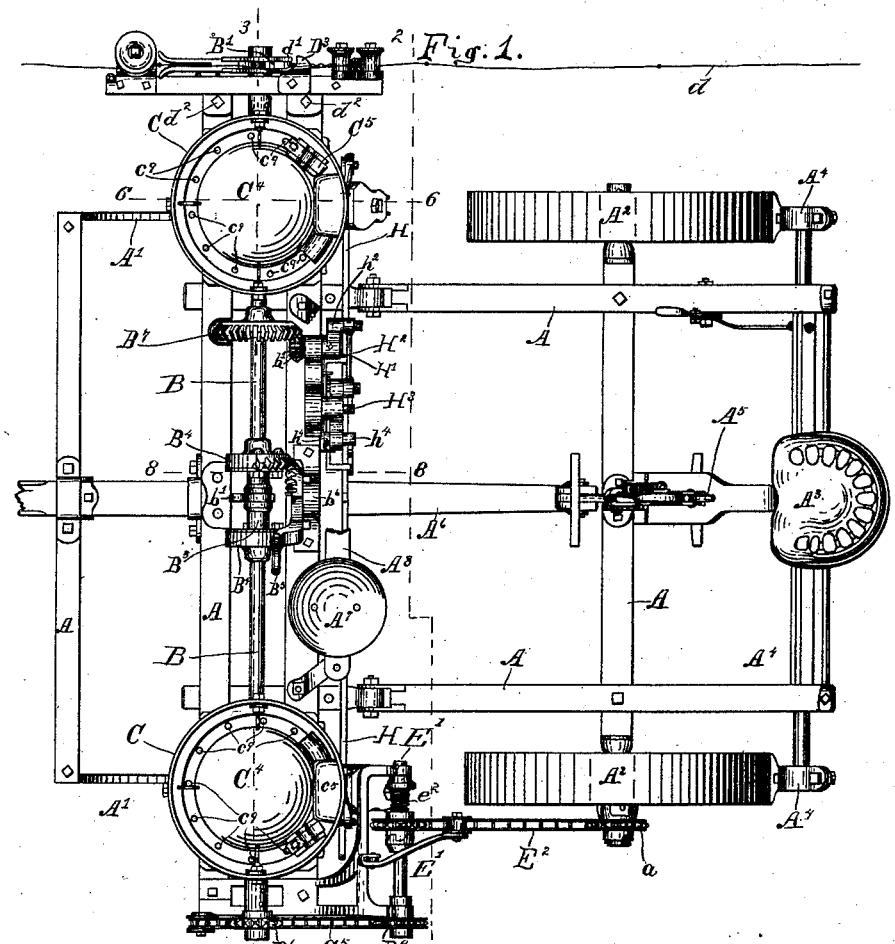
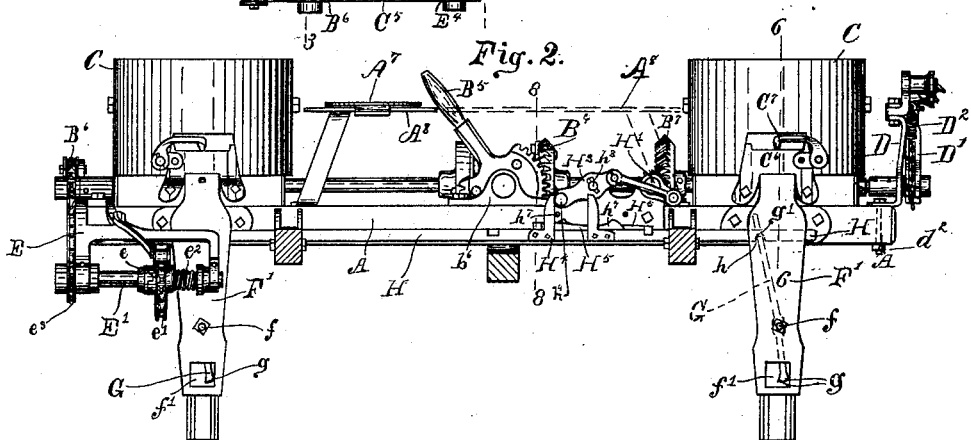
WITNESSES. INVENTOR.
Chas. A. Suffries, Thomas J. Lindsay,
E. W. Bradford, PER C. Bradford,
ATTORNEY.
N. PETERS, Photo-Lithographer, Washington, D. C.

(No Model.) 2 Sheets—Sheet 2.
T. J. LINDSAY.
PLANTER.
No. 358,046. Patented Feb. 22, 1887.
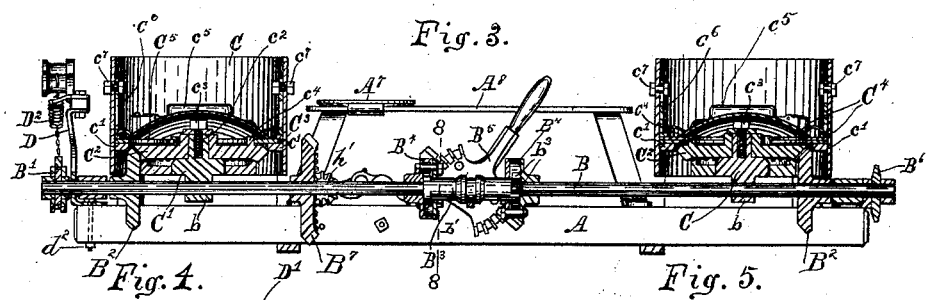
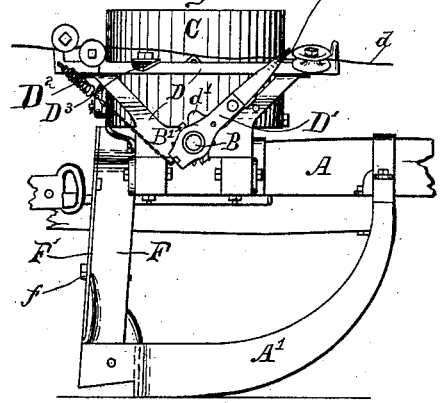
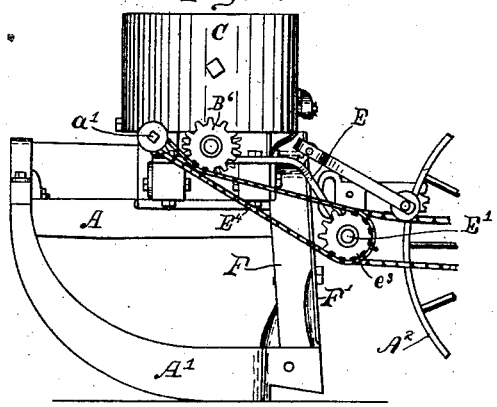
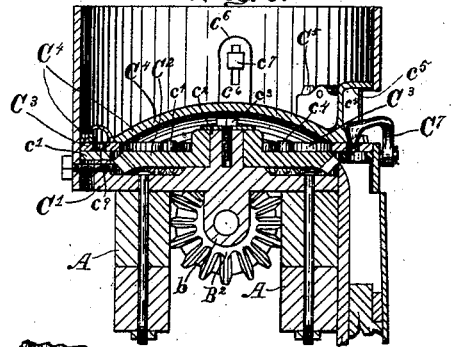
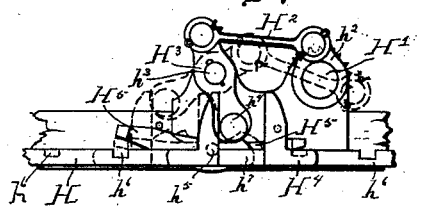
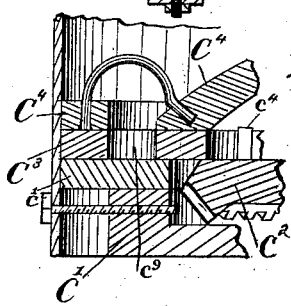
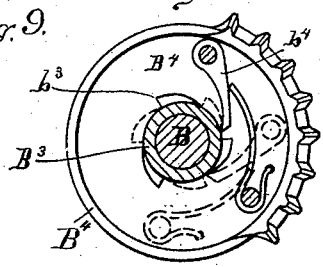
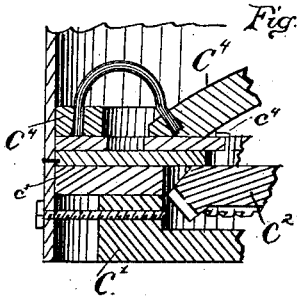
WITNESSES. INVENTOR.
Chas. A. Suffrins, Thomas J. Lindsay,
E. W. Bradford, PER C. Bradford, ATTORNEY.
N. PETERS, Photo-Lithographer, Washington, D. C.

United States Patent Office.

THOMAS J. LINDSAY, OF LAFAYETTE, INDIANA.

PLANTER.

SPECIFICATION forming part of Letters Patent No. 358,046, dated February 22, 1887.

Application filed October 5, 1886. Serial No. 215,376. (No model.)

*To all whom it may concern:*

Be it known that I, THOMAS J. LINDSAY, of the city of Lafayette, county of Tippecanoe, and State of Indiana, have invented certain new and useful Improvements in Planters, of which the following is a specification.

My said invention consists in various improvements in the details of construction of planters whereby a very perfect operation is secured and a planter produced which is capable of use either as a check-rower, a hand-planter, or a drill, as will be hereinafter more particularly described.

Referring to the accompanying drawings, which are made a part hereof, and on which similar letters of reference indicate similar parts, Figure 1 is a top or plan view of a planter embodying my improvements, one end being shown as provided with the check-rower mechanism and the other end with the drill mechanism; Fig. 2, a view looking to the left from the dotted line 2 2 in Fig. 1, showing the main part of the machine in rear elevation; Fig. 3, a transverse vertical section looking to the right from the dotted line 3 3 in Fig. 1; Fig. 4, an end elevation showing the check-rower mechanism; Fig. 5, a similar view showing the drill mechanism; Fig. 6, a detail sectional view on the dotted line 6 6 in Figs. 1 and 2; Fig. 7, a detail view similar to a portion of Fig. 2, showing the mechanism for operating and holding the bar H, on an enlarged scale, one position being represented in full lines and another in dotted lines; Fig. 8, a detail sectional view as seen from the dotted line 8 8 in Figs. 1 and 2; Fig. 9, a detail view showing a portion of Fig. 6, on an enlarged scale; and Fig. 10, a similar view of a portion of Fig. 3, illustrating the particular construction of feed-plate and adjacent mechanism shown at the right in said figure.

In said drawings the portions marked A represent the frame-work of the machine; B, the operating-shaft; C, the hoppers; D, the check-rower attachment; E, the drill attachment; F, the spouts; G, secondary droppers mounted in said spouts, and H an operating-bar for imparting motion to said secondary droppers.

The frame-work A is, in the main, of a well-known form, being of any suitable construction to carry the desired mechanism, and having the usual runners, A', to open the furrows, the usual wheels, A², for closing said furrows, the seat A³, scrapers A⁴ for cleaning the wheels, a lever, A⁵, and lifting-beam A⁶ for adjusting the planter, all of which are or may be of a well-known or any suitable construction, and need not be further described herein.

The operating-shaft B is journaled at each end in bearings $b$, formed in the under side of the cross-pieces C', which are part of the frame supporting the hopper, as will be presently described, and is supported at its center in an open bearing, $b'$, secured to the frame-work, as shown. On each end it is provided with circular racks B', by which it is operated, and has miter gear-wheels B², mounted thereon directly under the hoppers, for operating the rotating disks in said hoppers, as is usual. On its center is rigidly mounted a sleeve, B³, formed with rack-shaped ends $b^3$, each end having half the number of notches of the racks B', and so arranged that the notches of each end will correspond to the alternate notches of said racks B'. A wheel, B⁴, provided with an internal spring-pawl, $b^4$, is loosely mounted at each end of said sleeve, said pawls engaging with the racks of said ends, as shown. (See Fig. 8.) Said wheels are provided with cogs for a portion of their circumference, which engage with a toothed segment formed on the lower end of a hand-lever, B⁵, pivoted between said wheels B⁴ in an appropriate bearing, $b^6$, secured to the frame, as shown in Figs. 1 and 2. Thus, when it is desired to operate the planter by hand, the operator, sitting upon the seat A⁷, which is supported by and slides on the frame part A⁸, vibrates said hand-lever B⁵, which operates through the segment on its lower end to alternately rotate said wheels B⁴ forward and backward, the spring-pawl engaging with the notch and operating the shaft as said wheel is driven forward, and sliding over the notches when it is driven backward, thus insuring that the shaft B shall be driven in the same direction at all times, as will be readily understood. The notches of the racks $b^3$, corresponding to those of the racks B', also insures a uniform operation.

At the left of the drawings, Fig. 2, I show the machine geared to operate as a drill, and in such cases toothed gear-wheels B⁶, adapted to be driven by chain-belts, are substituted for the racks B', as will be presently more fully described.

The hoppers C are in most part of a well-known construction. They are mounted on the circular frame $c'$, as shown. Their rear sides are formed with an opening partially filled by a separate plate, $C^6$, secured to the frame by screws, as shown, (see especially Fig. 2,) and a knocker, $C^7$, pivoted on said part, extends through said opening and operates to force all seed out of the cups as they pass to the position to discharge. The bottom consists of the rotating disk $C^2$, mounted on the stud-shaft $c^2$ on the top of the cross-piece $C'$, as shown, and formed with a miter-gear edge, which engages with the miter gear-wheel $B^2$ on the operating-shaft B, said plate being secured on said stud-shaft $c^2$ by the screw $c^3$. A feed-plate, $C^3$, is mounted on top of said disk $C^2$, it being secured to rotate therewith by notches on its internal edge, which engage with upwardly-projecting pins $c^4$ on said disk, as shown. (See especially Figs. 3, 9, and 10.) Said feed-plate covers the open space between the outer edge of said disk and the inner edge of the circular frame $c'$, and is provided with the usual cups or orifices, $c^0$, for feeding the seed. Over said parts is mounted another plate, $C^4$, having an annular recess or opening near its outer edge which registers with the cups of said feeding-plate, thus covering all parts of the mechanism except that portion of the plate $C^3$ in which are said cups $c^0$. Said plate $C^4$ is formed at the point directly above the spouts with the housing $c^5$, which covers the opening in the rear side of said hoppers, as shown most plainly in Figs. 1 and 6, thus permitting the knocker $C^7$ to operate in said opening without permitting any seed to escape, as will be readily understood. A cut-off, $C^5$, is also pivoted to said plate $C^4$, just at the end of said housing where the seed passes under, for the usual purpose of cut-offs in this class of mechanism. Said plate $C^4$ is secured in position by slotted clips $c^6$, (shown most plainly in Figs. 3 and 6,) the ends of which bear down against the top of said plate, they being secured in position by bolts $c^7$, passing through the side of the hopper, as shown.

The check-rower attachment D is not of a peculiar construction, it consisting of a suitable frame removably secured to the frame of the machine and carrying the ordinary wheels and pulleys for guiding the wire $d$, and a lever, D', loosely mounted on the end of the shaft B and having pawl $d'$ for engaging with the rack B' and operating said shaft, a spring, $D^2$, being provided for throwing said lever back after being pulled forward by the wire. On the top of the frame I provide a stop, $D^3$, for stopping said lever before striking the pulleys, the inner face of said stop being formed inclined from the frame out to a square shoulder, which is arranged directly in front of the center of the pulleys. (See top part of Fig. 1.) Thus as said lever strikes said inclined face it is, before the wire leaves it, guided to a position directly in front of the center of said pulleys, which insures that said wire will not be thrown out of said pulleys by any vibration or irregular movement of said lever. The whole attachment is secured in place on the frame by the bolts $d^2$.

The drill attachment E is formed to be secured on the frame by the same bolts that secure the check-rower attachment, said check-rower attachment being removed when it is desired to convert the machine into a drill and this attachment substituted therefor, as will be readily seen. A shaft, E', forms part of this attachment, and has a collar, $e$, rigidly mounted thereon, which has a ratchet-face, and a toothed wheel, $e'$, is loosely mounted alongside said collar, which has a corresponding ratchet-face, a spring, $e^2$, being provided to hold said wheel against said collar. On the outer end of said shaft is mounted another toothed wheel, $e^3$. Said wheel $e'$ is connected to a toothed wheel, $a$, formed or secured on the end of the hub of one of the supporting-wheels of the frame or its axle by the chain-belt $E^2$, and is driven therefrom, thus driving the shaft E', which, through the toothed wheel $e^3$ on its outer end and the chain-belt $E^4$, passing under the toothed wheel $B^6$ on the end of the operating-shaft B and over a pulley, $a'$, on the frame, drives said operating-shaft in one direction continuously.

The spouts F are situated to receive the seed as it comes from the hopper and conduct it to the furrow just at the rear of the runner, as is usual. They are formed with an open rear side covered with the plate F', secured in position by a bolt, $f$. At their lower ends said plates are formed with an opening covered or filled with glass, or any suitable transparent material, $f'$, which permits the operation of the machine to be seen, as will be presently described.

The secondary droppers G are simply vertical partitions pivoted on the bolt $f$, and are provided on their lower ends with flanges $g$, adapted to press against each side of the spout and hold the grain from falling to the ground. At the top each is provided with a notch, $g'$, with which the operating-bar H engages, as shown by dotted lines in Fig. 2.

The operating-bar H is a straight bar or rod extending across from one side to the other, and has notches $h$ in its ends, which engage with the upper ends of the secondary droppers G. It has uprights $H^4$, between which an operating-pin, $h^4$, on a pivoted arm, $H^3$, (mounted on a pivot, $h^3$,) extends and is operated thereby, said pivoted arm receiving motion from the operating-shaft B, through a link or pitman, $H^2$, connecting it to a crank-arm, $h^2$, a short shaft, H', on which said crank-arm is mounted, and which has a bevel-pinion, $h'$, on the other end, and a bevel gear-wheel, $B^7$, on said shaft B, which engages with said pinion $h'$. To secure or hold said bar H from accidental movement after being operated, I pivot two catches, $H^5$, to the frame on a pivot, $h^5$, which engage with notches $h^6$ in the top edge of the bar H, their rear ends being formed with cam projections $h^7$, with which the operating-pin $h^4$ on the arm $H^3$ engages at each operation, and thus lifts their opposite ends or catch parts out of the notches in said bar. Thus, as the operating-shaft B revolves to empty one of the seed-cups of the feeding-plate into the spout, the bar H is given a lateral motion, which draws the tops of the secondary droppers or valves from one side of the spout to the other, bringing their lower ends against the opposite side and catching the "hill" or portion of seed that is dropped, and holding it at said lower end in front of the glass portion until the mechanism is operated again, when another hill of seed is dropped and caught in like position, the hill previously dropped being released and permitted to fall into the ground, the catches $H^5$ operating at all times to hold the bar securely, except when the mechanism is operated and the pin brought against their cam-formations to release them from the notches $h^6$. The operator is thus permitted at all times to notice the amount of seed being dropped and detect at once any irregularity in the operation of the machine.

By this construction, as will be readily understood, I combine in one machine all the peculiarities of the check-rower, the hand-dropper, and the drill with but slight additional expense. The check-rower attachment and the drill attachment being so constructed as to be quickly and easily substituted one for the other, and by means of the hand-lever $B^5$, wheels $B^4$, and collar $B^3$, at the center of the shaft B, a very efficient and easily-operated hand-dropping mechanism is provided, which may be used in connection with the check-rower attachment for dropping across the ends, or may be used independently, said attachments being removed altogether, if desired.

As will be readily understood, when the machine is being used as a drill, the secondary droppers G are removed from the machine, as in such cases a continuous stream of seed is desired rather than the dropping in hills. In such cases it is also usually desired to drop the seeds singly rather than several together, and it is therefore necessary to make the seed-cups in the feeding-plate smaller, which I accomplish by substituting two plates for the one, making the cups in the top plate and connecting it with the rotating disk, while the other plate, C, is held stationary by a lug, $c^8$, formed on the side thereof and engaging with the side of the hopper, (see especially Fig. 10,) this supplemental or false bottom being necessary to make the parts of the same thickness as the regular-sized plate is with the check-rower mechanism in position.

Having thus fully described my said invention, what I claim as new, and desire to secure by Letters Patent, is—

1. The combination, in a planter, of the supporting-frame, the feeding mechanism, an operating-shaft for driving said feeding mechanism, a removable rack or pinion mounted thereon, and mechanism engaging with said rack or pinion for operating said shaft, said mechanism being detachably secured on said frame, substantially as set forth.

2. The combination, in a planter, of the check-rower mechanism supported from a single frame and formed to be detachable from said planter, an operating-shaft provided on its outer end with a toothed wheel or rack with which said check-rower mechanism engages, the feeding mechanism, and the supporting-frame constructed to support all of said various mechanism, substantially as set forth.

3. In a planter, the combination, with the operating-shaft, of two racks rigidly secured thereto, a gear-wheel mounted alongside each rack and provided with a spring-pawl adapted to engage with said racks, and a pivoted lever formed with a toothed segment on its lower end, each side of which engages with one of said wheels, whereby a means is provided for operating said shaft where the check-rower mechanism is impracticable, substantially as described, and for the purposes specified.

4. In a planter, the combination, with the operating-shaft B and the check-rower mechanism for operating the same, of the sleeve $B^3$, rigidly secured thereto, a rack formed on each end of said sleeve, the notches of one end being arranged between the notches of the other, a gear-wheel, $B^4$, loosely mounted on said shaft at each end of said sleeve and provided with a spring-pawl engaging with the racks of said sleeve, and the lever $B^5$, pivoted on the frame-work and carrying a toothed segment on its lower end, said toothed segment being arranged to engage with and operate each of said wheels and move them in opposite directions, substantially as set forth.

5. In a planter, the combination, with the hopper C, provided with an opening in its rear side, of the feeding mechanism within, means for operating the same, and a plate, $C^4$, formed with a housing, $c^3$, covering said opening, substantially as described, and for the purposes specified.

6. The combination, in a planter, with the hopper C and feeding mechanism, of a knocker, $C^7$, pivoted to said hopper and extending through an opening in its rear side, and the plate $C^4$, provided with a housing, $c^5$, said housing being arranged to cover said opening and the operating end of said knocker, whereby said knocker is permitted to operate freely without danger of allowing any seed to escape, substantially as set forth.

7. In the feeding mechanism of a planter, the combination of the spouts F, having a glass part at their lower ends, secondary droppers or partitions G, pivoted in said spouts, the operating-bar H, engaging with the tops of said secondary droppers and provided with uprights $H^4$, the wheel $B^7$, shaft $H'$, wheel $h'$, crank-arm $h^2$, link $H^2$, and the pivoted arm $H^3$, arranged, as shown, for operating said bar, all substantially as set forth.

8. The combination, in a planter, with the secondary droppers G, operating-bar H, and mechanism for operating said bar, of the catches H⁵, pivoted to the frame and arranged to engage with notches in the top of said bar and hold it at the limit of its stroke, their other ends being provided with a cam formation arranged to engage with the lower end of the operating-arm, whereby they are lifted out of engagement with said notches when it is desired to operate the device, substantially as set forth.

In witness whereof I have hereunto set my hand and seal at Indianapolis, Indiana, this 28th day of September, A. D. 1886.

THOMAS J. LINDSAY. [L. S.]

In presence of—
C. BRADFORD,
CHARLES L. THURBER.